(12) United States Patent
Cheng

(10) Patent No.: US 11,477,646 B2
(45) Date of Patent: Oct. 18, 2022

(54) METHOD AND A DEVICE FOR PERFORMING WIRELESS CONNECTION PRE-AUTHORIZATION ON A USER DEVICE

(71) Applicant: SHANGHAI ZHANGMEN SCIENCE AND TECHNOLOGY CO., LTD., Shanghai (CN)

(72) Inventor: Han Cheng, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 311 days.

(21) Appl. No.: 16/796,964

(22) Filed: Feb. 21, 2020

(65) Prior Publication Data

US 2020/0196149 A1 Jun. 18, 2020

Related U.S. Application Data

(63) Continuation of application No. PCT/CN2018/098513, filed on Aug. 3, 2018.

(30) Foreign Application Priority Data

Aug. 21, 2017 (CN) .......................... 201710720677.6

(51) Int. Cl.
*H04W 12/062* (2021.01)
*H04W 48/08* (2009.01)
(Continued)

(52) U.S. Cl.
CPC ......... *H04W 12/062* (2021.01); *H04W 8/005* (2013.01); *H04W 12/64* (2021.01); *H04W 48/08* (2013.01)

(58) Field of Classification Search
CPC ... H04W 12/062; H04W 8/005; H04W 12/64; H04W 48/08; H04W 12/08
See application file for complete search history.

(56) References Cited

U.S. PATENT DOCUMENTS

| 9,125,136 B2 * | 9/2015 | Bombacino | ........... H04W 12/08 |
| 2007/0076671 A1 | 4/2007 | Winget et al. | |
| 2013/0282903 A1 * | 10/2013 | DeLuca | ................ H04W 12/50 709/225 |

FOREIGN PATENT DOCUMENTS

| CN | 104363631 A | 2/2015 |
| CN | 105873106 A | 8/2016 |

(Continued)

OTHER PUBLICATIONS

English Machine Translation of CN-107396364 A (Cheng, Published Nov. 24, 2017) (Year: 2017).*

*Primary Examiner* — Juan M Guillermety
(74) *Attorney, Agent, or Firm* — Kilpatrick Townsend & Stockton, LLP

(57) ABSTRACT

An embodiment of the present application is to provide a method and a device for performing wireless connection pre-authorization on a user device. In the present application, the user device transmits a wireless connection pre-authorization request to a network device; after receiving the wireless connection pre-authorization request, the network device determines pre-authorization information for device identification information of the user device with respect to a wireless routing device corresponding to the wireless connection pre-authorization request according to the device identification information of the user device, and transmits the device identification information of the user device and the pre-authorization information for the device identification information of the user device with respect to the wireless routing device to the wireless routing device; if the pre-authorization information comprises a successful pre-authorization, the wireless routing device performs wireless connection pre-authorization on the device identification information of the user device.

12 Claims, 2 Drawing Sheets

(51) Int. Cl.
*H04W 8/00* (2009.01)
*H04W 12/64* (2021.01)

(56) References Cited

FOREIGN PATENT DOCUMENTS

| CN | 106489284 A | 3/2017 |
|---|---|---|
| CN | 107396364 A | 11/2017 |
| CN | 107567021 A | 1/2018 |

\* cited by examiner

METHOD AND A DEVICE FOR PERFORMING WIRELESS CONNECTION PRE-AUTHORIZATION ON A USER DEVICE

CROSS REFERENCE TO THE RELATED APPLICATION

This application is the continuation application of International Application No. PCT/CN2018/098513, filed on Aug. 3, 2018, which is based upon and claims priority to Chinese Patent Application No. 201710720677.6, filed on Aug. 21, 2017, the entire contents of which are incorporated herein by reference.

FIELD

The present application relates to communication, and more particularly relates to a technology for performing wireless connection pre-authorization on a user device.

BACKGROUND

With the popularity of mobile devices and the development of the Internet, people increasingly rely on wireless networks in their daily lives. Public wireless networks have low security. People usually choose to perform connection authentication encryption on wireless networks to restrict unauthorized users from accessing the wireless networks, to ensure the security.

When a mobile device connects to an encrypted wireless network, cooperation with a routing device is often required. However, a traditional router's authentication and authorization method is passive, and the hotspot owner often needs to provide an authentication password to the user who requests connection. Wireless connections can be available only when the authorization is completed after the authentication is passed in some way. In this process, the authentication and authorization process is in serial with the process of the user using the network. The user's operation is thus tedious, time-consuming, and the time for authorization is long, resulting in a poor user experience.

SUMMARY

One embodiment of the present application to provide a method and a device for performing wireless connection pre-authentication on a user device.

According to an aspect of the present application, it is provided a method for performing wireless connection pre-authorization on a user device at the user device. The method comprises:

transmitting a wireless connection pre-authorization request of the user device to a network device.

According to another aspect of the present application, it is provided a method for performing wireless connection pre-authorization on a user device at a network device. The method comprises:

acquiring a wireless connection pre-authorization request transmitted by the user device;

determining pre-authorization information for device identification information of the user device with respect to a wireless routing device corresponding to the wireless connection pre-authorization request according to the device identification information of the user device;

transmitting the device identification information of the user device and the pre-authorization information for the device identification information of the user device with respect to the wireless routing device to the wireless routing device.

According to a further aspect of the present application, it is provided a method for performing wireless connection pre-authorization on a user device at a wireless routing device. The method comprises:

receiving device identification information of the user device and the pre-authorization information for the device identification information of the user device with respect to the wireless routing device transmitted by a network device;

if the pre-authorization information comprises a successful pre-authorization, performing wireless connection pre-authorization on the device identification information of the user device.

According to yet a further aspect of the present application, it is provided a method for performing wireless connection pre-authorization on a user device. The method comprises:

transmitting, by the user device, a wireless connection pre-authorization request to a network device;

acquiring, by the network device, the wireless connection pre-authorization request transmitted by the user device;

determining, by the network device, pre-authorization information for device identification information of the user device with respect to a wireless routing device corresponding to the wireless connection pre-authorization request according to the device identification information of the user device;

transmitting, by the network device, the device identification information of the user device and the pre-authorization information for the device identification information of the user device with respect to the wireless routing device to the wireless routing device;

receiving, by the wireless routing device, the device identification information of the user device and the pre-authorization information for the device identification information of the user device with respect to the wireless routing device transmitted by the network device;

if the pre-authorization information comprises a successful pre-authorization, performing, by the wireless routing device, wireless connection pre-authorization on the device identification information of the user device.

According to another aspect of the application, a computer readable medium comprising instructions is provided, wherein the instructions, when executed, cause a system to perform the operations of the above mentioned methods.

According to a further aspect of the present application, it is provided a user device for performing wireless connection pre-authorization for the user device. The user device comprises:

a processor; and a memory configured to store computer executable instructions, and the executable instructions, when executed, cause the processor to perform the above mentioned methods.

According to a further aspect of the present application, it is provided a network device for performing wireless connection pre-authorization on a user device. The network device comprises:

a processor; and a memory configured to store computer executable instructions, and the executable instructions, when executed, cause the processor to perform the above mentioned methods.

According to a further aspect of the present application, it is provided a wireless routing device for performing wireless connection pre-authorization on a user device. The wireless routing device comprises:

a processor; and a memory configured to store computer executable instructions, and the executable instructions, when executed, cause the processor to perform the above mentioned methods.

Compared with the prior art, in the present application, a user device transmits a wireless connection pre-authentication request to a network device; after receiving the wireless connection pre-authorization request, the network device determines pre-authorization information for device identification information of the user device with respect to a wireless routing device corresponding to the wireless connection pre-authorization request according to the device identification information of the user device, and transmits the device identification information of the user device and the pre-authorization information for the device identification information of the user device with respect to the wireless routing device to the wireless routing device; if the pre-authorization information comprises a successful pre-authorization, the wireless routing device performs wireless connection pre-authorization on the device identification information of the user device; since the user device has been pre-authorized, the user subsequently connects to a wireless access point corresponding to the wireless routing device by the user device without the need for an authorization process. Therefore, the user is released from tedious operations, the time for establishing connection is reduced, and user experience is optimized. Further, the wireless connection pre-authorization request may include target address information, identification information of a target wireless access point, target period information, etc. The user may select target address information, identification information of a target wireless access point, target period information and the like and initiate the wireless connection pre-authorization request to the network device, to bring more convenience to the user's operation.

DESCRIPTIONS OF THE DRAWINGS

Embodiments of the present application will become more apparent by reading the detailed description with reference to the following drawings.

The identical or similar reference numerals in the drawings represent the identical or similar components.

DETAILED EMBODIMENTS

The application is further described in detail below with reference to the accompanying drawings.

In a typical configuration of the present application, a terminal, a device of a service network and a trusted party all include one or more processors (CPUs), an input/output interface, a network interface and a memory.

The memory may include a non-permanent memory, a random access memory (RAM) and/or a non-volatile memory and the like in a computer-readable medium, such as a read-only memory (ROM) or a flash memory (flash RAM)). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which may be used to store information that may be accessed by a computing device.

Figure 1:
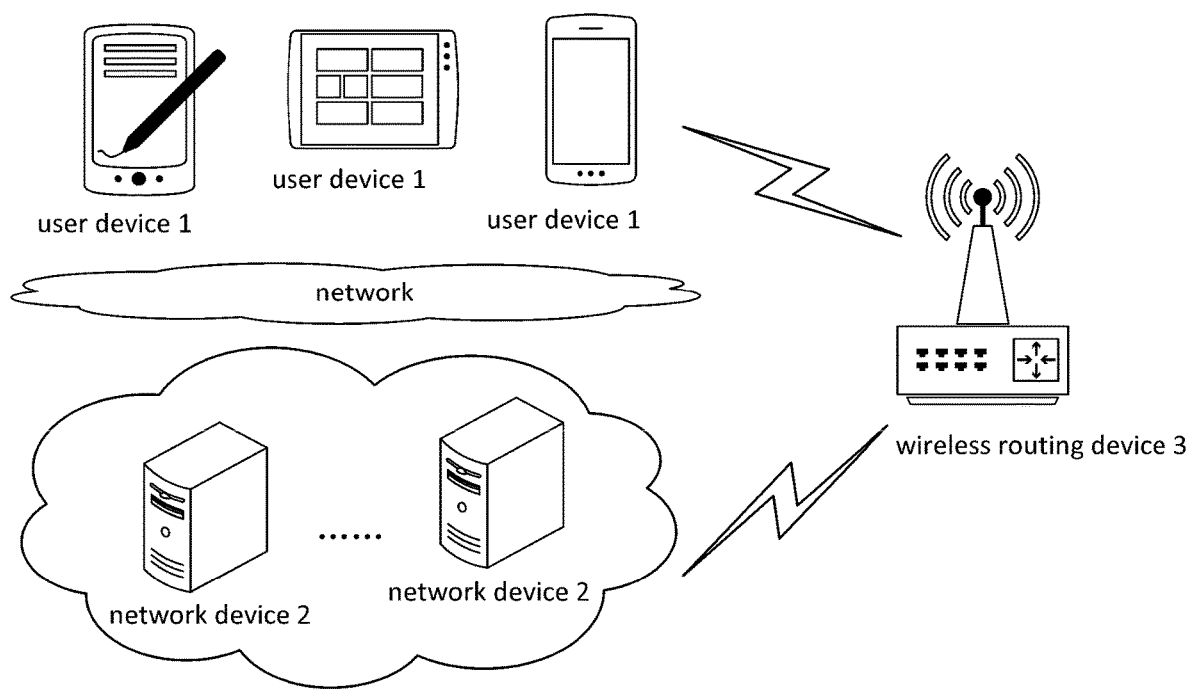
FIG. 1 shows a topology diagram of a system for performing wireless connection pre-authorization on a user device according to an embodiment of the present application.

FIG. 1 shows a topology diagram of a system for performing wireless connection pre-authorization on a user device according to an embodiment of the present application. The system comprises a user device 1, a network device 2 and a wireless routing device 3.

Here, the user device 1 includes but is not limited to any type of electronic product with human-machine interaction with the users, for example, an intelligent phone, a tablet, a laptop, etc. The electronic products may run on any operating system, such as android operating system, iOS operating system, Windows operating system, etc. The network device 2 includes an electronic device with automatically performing numeral calculations and information processing according to preset or stored instructions. It's hardware includes but is not limited to micro-processors, application specific integrated circuits (ASIC), programmable gate array (FPGA), digital signal processors (DSP), embedded devices, etc. The network device 2 includes but is not limited to: computers, mainframes, single network server, a cloud composed of multiple network server sets or multiple servers. Cloud as used herein is formed by a massive amount of computers or network servers based on cloud computing, and cloud computing is a type of distributed computing, which is a virtual super computer composed of a group of loosely coupled computer sets. Networks include but are not limited to internet, Wide Area Network (WAN), Metropolitan Area Network (MAN), Local Area Network (LAN), Virtual Private Network (VPN), wireless ad-hoc network, etc. The wireless routing device 3 includes a device to connect various local area networks, wide area networks. In one embodiment, the wireless routing device 3 is to broadcast wireless access points to user devices within a range based on a protocol cluster of 802.11. In one embodiment, the authentication type of the wireless routing device 2 is a non-open system authentication.

In some embodiments, the number of various network elements shown in FIG. 1 for the sake of brevity might be smaller than the number in practical networks. This omission is undoubtedly based on the premise that it will not affect the clear and sufficient disclosure of the present disclosure.

Figure 2:
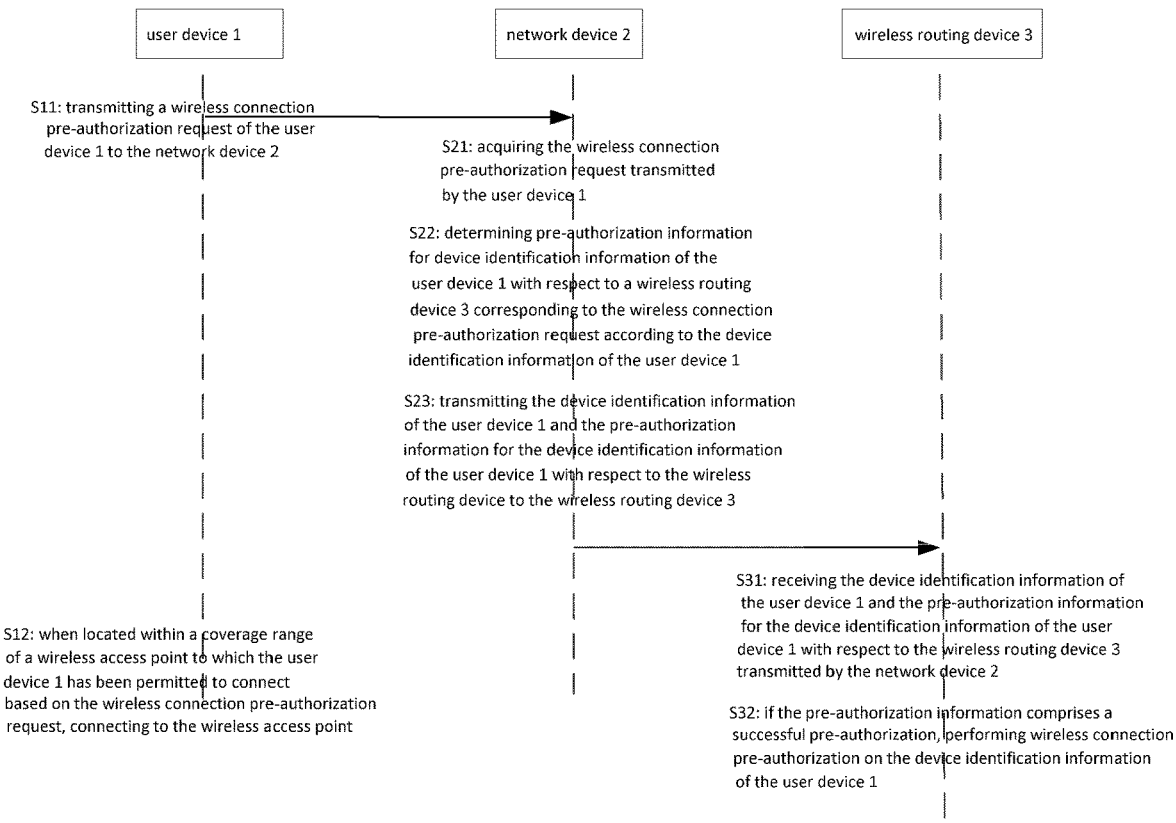
FIG. 2 shows a flowchart of a method for performing wireless connection pre-authorization on a user device according to another embodiment of the present application.

FIG. 2 shows a flowchart of a method for performing wireless connection pre-authorization on a user device according to another embodiment of the present application. The method comprises step S11 and step S12 performed at the user device, step S21, step S22 and step S23 performed at the network device, and step S31 and step S32 performed at the wireless routing device.

In one embodiment, at step S11, the user device 1 transmits a wireless connection pre-authorization request of the user device 1 to the network device 2. At step S21, the network device 2 acquires the wireless connection pre-authorization request transmitted by the user device 1. At step S22, the network device 2 determines pre-authorization information for device identification information of the user device 1 with respect to a wireless routing device 3 corresponding to the wireless connection pre-authorization request according to the device identification information of the user device 1. At step S23, the network device 2 transmits the device identification information of the user device 1 and the pre-authorization information for the device identification information of the user device 1 with respect to the wireless routing device to the wireless routing device 3. At step S31, the wireless routing device 3 receives the device identification information of the user device 1 and the pre-authorization information for the device identification information of the user device 1 with respect to the wireless routing device 3 transmitted by the network device 2. At step S32, if the pre-authorization information comprises a successful pre-authorization, the wireless routing device 3 performs wireless connection pre-authorization on the device identification information of the user device 1. At step S12, when located within a coverage range of a wireless access point to which the user device 1 is permitted to connect based on the wireless connection pre-authorization request, the user device 1 connects to the wireless access point.

In an example, user A is supposed to possess the user device 1. If user A wants to go to somewhere proximate the wireless routing device 3 (e.g., the wireless routing device 3 is possessed by the employer of user A and user A wants to go to work), user A may transmit the wireless connection pre-authorization request to the network device 2 by the user device 1. The network device 2 then transmits the pre-authorization information and device identification information of the user device 1 to the wireless routing device 3 based on the wireless connection pre-authorization request. The wireless routing device 3 performs wireless connection pre-authorization on the user device 1 according to the device identification information of the user device 1. When user A arrives at somewhere near the wireless routing device 3 (for example, the wireless routing device 3 is possessed by the employer of user A and user A arrives at his/her company), since the user device 1 possessed by user A has been pre-authorized, the user device 1 may connect to a wireless access point corresponding to the wireless routing device 3 without the need for authorization, thus optimizing the user experience for wireless connection for user A.

In one embodiment, the wireless connection pre-authorization request further comprises device identification information of the user device 1. The device identification information includes but is not limited to: MAC address information, device sequence number information, Bluetooth identification information, user account information, phone number information, and the like. The network device 2 may extract the device identification information of the user device 1 from the wireless connection pre-authorization request after receiving the wireless connection pre-authorization request transmitted by the user device 1.

In the above example, after the network device 2 receives the wireless connection pre-authorization request transmitted by the user device 1, the network device 2 determines pre-authorization information for the device identification information of the user device 1 with respect to the wireless routing device 3 corresponding to the wireless connection pre-authorization request according to the device identification information of the user device 1. That is, the network device 2 has to determine which wireless routing device (for example, the wireless routing device 3) to which the user device 1 requests to be pre-authorized to connect. The network device 2 may also query and determine whether the user device 1 has been pre-authorized to connect to the wireless routing device based on the device identification information, thus obtaining the pre-authorization information (for example, including a successful pre-authorization, a failed pre-authorization, or an indication of no need for duplicate authorization). If the user device 1 has been previously pre-authorized to connect to the wireless routing device 3 and the pre-authorization is still valid, there is no need to pre-authorize the user device 1 for connecting to the wireless routing device 3 again. In practice, the user device 1 may be pre-authorized to connect to the wireless routing device 3 one more time.

In the above example, after the wireless routing device 3 receives the pre-authorization information and the device identification information of the user device 1 transmitted by the network device 2, if the pre-authorization information comprises a successful pre-authorization, the wireless routing device 3 performs wireless connection pre-authorization on the device identification information of the user device 1. Correspondingly, if the pre-authorization information comprises a failed pre-authorization or an indication of no need for duplicate authorization, the wireless routing device 3 does not have to perform wireless connection pre-authorization on the device identification information of the user device 1.

In one embodiment, the wireless connection pre-authorization request comprises at least one of: target address information corresponding to the wireless connection pre-authorization request; target period information corresponding to the wireless connection pre-authorization request; device identification information and/or access point identification information of a target wireless access point corresponding to the wireless connection pre-authorization request.

In an example, user B is supposed to possess the user device 1. In the example, the wireless routing device 3 is supposed to be located in coffee shop X. If user B wants to go to coffee shop X, user B may open a particular application (e.g., an application providing wireless connection service) on the user device 1 and transmit the wireless connection pre-authorization request to the network device 2 by the particular application. User B may submit the address of coffee shop X (i.e., the target address information) by the particular application when transmitting the wireless connection pre-authorization request. Or user B may submit device identification information (e.g., BSSID) and/or access point identification information (e.g., SSID) of a wireless access point (i.e., the target wireless access point) corresponding to the wireless routing device 3 by the particular application. If user B wants to be at coffee shop X during 10:00 to 11:00 am on Saturday (i.e., the target period information), user B may submit the address of coffee shop X (i.e., the target address information) and the target period information by the particular application when transmitting the wireless connection pre-authorization request.

In one embodiment, step S11 comprises: the user device 1 detects the device identification information and/or access point identification information of the target wireless access point; the user device 1 transmits the wireless connection pre-authorization request of the user device 1 to the network device 2. In one embodiment, the wireless connection pre-authorization request comprises device identification information and/or access point identification information of a target wireless access point corresponding to the wireless connection pre-authorization request.

Continued with the above example, user B may input a target wireless access point (a wireless access point corresponding to the wireless routing device 3) in the particular application on the user device 1. The user device 1 detects the device identification information and/or access point identification information of the target wireless access point according to the information input by user B, and then transmits the wireless connection pre-authorization request to the network device 2.

In one embodiment, the wireless connection pre-authorization request comprises target address information corresponding to the wireless connection pre-authorization request. Step S22 comprises: the network device 2 queries and determines a wireless routing device 3 corresponding to the wireless connection pre-authorization request according to the target address information, and determines pre-authorization information for the device identification information of the user device 1 with respect to the wireless routing device 3 according to the device identification information of the user device 1.

Continued with the above example, user B may input target address information (e.g., coffee shop X) in the particular application on the user device 1. The user device 1 then transmits the wireless connection pre-authorization request to the network device 2. The network device 2 queries and determines which wireless routing devices (e.g., the wireless routing device 3) are located in proximity to coffee shop X according to the target address information, and then queries and determines whether the user device 1 may be pre-authorized to connect to the wireless routing device based on the device identification information after receiving the wireless connection pre-authorization request.

In one embodiment, the wireless connection pre-authorization request further comprises target period information corresponding to the wireless connection pre-authorization request. The pre-authorization information for the device identification information of the user device 1 with respect to the wireless routing device 3 is valid within the target period information.

Continued with the above example, user B is supposed to be at coffee shop X during 10:00 to 11:00 am on Saturday (i.e., the target period information). User B may submit the target period information by the particular application on the user device 1 when the user device 1 transmits the wireless connection pre-authorization request to the network device 2. The network device 2 may only pre-authorize the user device 1 to connect to a wireless access point corresponding to the wireless routing device 3 within the target period information after receiving the wireless connection pre-authorization request. The wireless routing device 3 only permits the user device 1's wireless connection within the target period information according to the pre-authorization information transmitted by the network device 2. If the user device 1 intends to connect to the wireless access point corresponding to the wireless routing device 3 beyond the target period information, further authorization or authentication is required.

Figure 3:
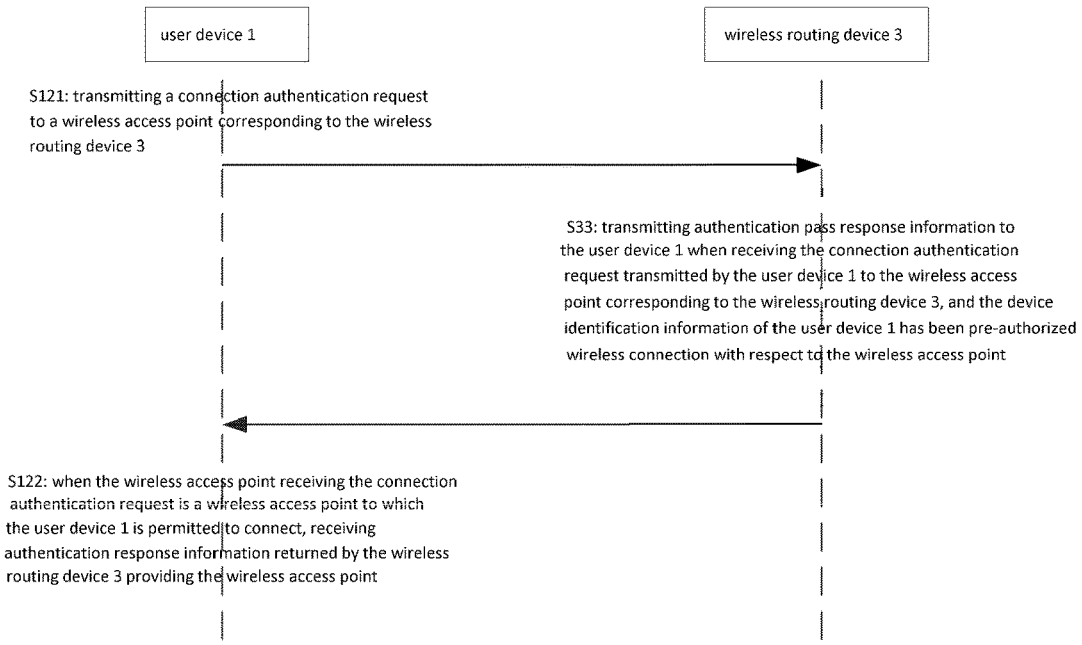
FIG. 3 shows a flowchart of a method for performing connection authentication on a user device by a wireless routing device according to a further embodiment of the present application.

In one embodiment, as illustrated by FIG. 3, the method further comprises step S33 performed at the wireless routing device. Step S21 comprises step S121 and step S122.

At step S121, the user device 1 transmits a connection authentication request to a wireless access point corresponding to the wireless routing device 3. At step S33, when the wireless routing device 3 receives the connection authentication request transmitted by the user device 1 to the wireless access point corresponding to the wireless routing device 3, and the device identification information of the user device 1 has been pre-authorized wireless connection with respect to the wireless access point, the wireless routing device 3 transmits authentication pass response information to the user device 1. At step S122, when the wireless access point receiving the connection authentication request is a wireless access point to which the user device 1 is permitted to connect, the user device 1 receives authentication response information returned by the wireless routing device 3 providing the wireless access point.

In an example, user A is supposed to possess the user device 1. When user A arrives somewhere proximate the wireless routing device 3, the user device 1 may automatically transmit a connection authentication request to the wireless access point corresponding to the wireless routing device 3, or the user device 1 may transmit the connection authentication request to the wireless access point corresponding to the wireless routing device 3 based on user A's manual operation. The wireless routing device 3 determines whether the user device 1 has been pre-authorized based on the device identification information of the user device 1 after receiving the connection authentication request. If the device identification information of the user device 1 has been pre-authorized wireless connection with respect to the wireless access point, the wireless routing device 3 returns authentication pass response information to the user device 1. The user device 1 may connect to the wireless access point corresponding to the wireless routing device 3 successfully.

In one embodiment, after establishing wireless connection between the user device 1 and the wireless routing device 3 (the user device 1 cannot access networks through the wireless routing device 3 at this moment), the user device 1 transmits its corresponding device identification information to the wireless routing device 3 for verification over the wireless connection. If the device identification information transmitted by the user device 1 is consistent with the device identification information previously transmitted by the network device 2, the wireless routing device 3 permits network access for the user device.

In one embodiment, the pre-authorization information is valid within the target period information. Step S33 comprises: when the wireless routing device 3 receives the connection authentication request transmitted by the user device 1 to the wireless access point corresponding to the wireless routing device 3, and the connection authentication request is transmitted within the target period information, and the device identification information of the user device 1 has been pre-authorized wireless connection with respect to the wireless access point, the wireless routing device 3 transmits authentication pass response information to the user device 1.

In an example, the wireless connection pre-authorization request transmitted by the user device 1 to the network device 2 includes the target period information. The network device 2 may only pre-authorize the user device 1 to connect to a wireless access point corresponding to the wireless routing device 3 within the target period information after receiving the wireless connection pre-authorization request.

The wireless routing device 3 receives the pre-authorization information transmitted by the network device 2. The pre-authorization information is valid within the target period information.

In one embodiment, step S33 further comprises: if the device identification information of the user device 1 has not been pre-authorized wireless connection with respect to the wireless access point, the wireless routing device 3 performs authentication on the connection authentication request and transmits corresponding authentication result information to the user device 1.

In the embodiment, the wireless routing device 3 determines whether the user device 1 has been pre-authorized based on the device identification information of the user device 1 after receiving the connection authentication request transmitted by the user device 1. If the device identification information of the user device 1 has not been pre-authorized wireless connection with respect to the wireless access point, the wireless routing device 3 cannot directly return authentication pass response information to the user device 1. The wireless routing device 3 has to perform normal authentication on the connection authentication request, and then transmits corresponding authentication result information to the user device 1 (e.g., including a successful authentication or a failed authentication).

In one embodiment, the method further comprises: the user device 1 transmits one or more wireless access points scanned by the user device 1 to the network device 2. The network device 2 receives the one or more wireless access points scanned by the user device 1 which are transmitted by the user device 1. The network device 2 determines pre-authorization information for device identification information of the user device 1 with respect to the one or more wireless access points according to the device identification information of the user device 1. The network device 2 returns the pre-authorization information for the device identification information of the user device 1 with respect to the one or more wireless access points to the user device 1. The user device 1 receives the pre-authorization information for the device identification information of the user device 1 with respect to the one or more wireless access points returned by the network device 2.

In an example, user C is supposed to possess the user device 1. If user C wants to access wireless networks by the user device 1, user C may open a particular application (e.g., an application providing wireless connection service) on the user device 1. The user device 1 transmits the scanned wireless access points W1, W2, W3, and W4 to the network device 2 based on user C's operation (such as clicking "one click search"). The network device 2 determines whether the user device 1 has been pre-authorized connection to wireless access points W1, W2, W3, W4 according to the device identification information of the user device 1 after receiving the wireless access points W1, W2, W3 and W4. The user device 1 is supposed to have been pre-authorized connection to wireless access points W1 and W4, and the user device 1 is supposed to have not been pre-authorized connection to wireless access points W2 and W3. The network device 2 returns the pre-authorization information for the device identification information of the user device 1 with respect to the various wireless access points to the user device 1. In one embodiment, the user device 1 may present the wireless access points W1, W2, W3 and W4 by the particular application and may present whether the user device 1 has been pre-authorized wireless connection to the wireless access points after receiving the pre-authorization information.

In one embodiment, step S12 comprises: the user device 1 recognizes wireless access points to which the user device 1 has been permitted to connect according to the pre-authorization information, and automatically connects to a preferred wireless access point from the wireless access points to which the user device 1 has been permitted to connect.

Continued with the above example, among the wireless access points W1, W2, W3 and W4 scanned by the user device 1, the user device 1 has been pre-authorized connection to the wireless access points W1 and W4 and has not been pre-authorized connection to the wireless access points W2 and W3. The user device 1 determines a preferred wireless access point from the wireless access points W1 and W4 (e.g., according to signal strength, network speed, etc.) and initiates automatic connection to the preferred wireless access point.

In one embodiment, the method further comprises: the user device 1 transmits an automatic connection request to the network device 2. The network device 2 receives the automatic connection request transmitted by the user device 1. The network device 2 determines a preferred wireless access point based on the automatic connection request. The geographic location information of the preferred wireless access point matches the geographic location information of the user device 1 and the preferred wireless access point is a wireless access point to which the user device 1 has been permitted to connect. The network device 2 returns the preferred wireless access point to the user device 1. The user device 1 receives the preferred wireless access point returned by the network device 2. The user device 1 automatically connects to the preferred wireless access point.

In an example, after user C opens a particular application on the user device 1, the user device 1 transmits an automatic connection request to the network device 2 based on user C's operation. The network device 2 determines a preferred wireless access point to which the user device 1 has been pre-authorized to connect (e.g., according to signal strength, network speed, etc.) from among the queried wireless access points proximate the current geographic location of the user device 1 after receiving the automatic connection request. The network device 2 then returns the preferred wireless access point to the user device 1 so that the user device 1 may initiate automatic connection to the preferred wireless access point.

According to yet a further aspect of the present application, it is provided a method for performing wireless connection pre-authorization on a user device. The method comprises:

transmitting, by the user device, a wireless connection pre-authorization request to a network device;

acquiring, by the network device, the wireless connection pre-authorization request transmitted by the user device;

determining, by the network device, pre-authorization information for device identification information of the user device with respect to a wireless routing device corresponding to the wireless connection pre-authorization request according to the device identification information of the user device;

transmitting, by the network device, the device identification information of the user device and the pre-authorization information for the device identification information of the user device with respect to the wireless routing device to the wireless routing device;

receiving, by the wireless routing device, the device identification information of the user device and the pre-authorization information for the device identification information of the user device with respect to the wireless routing device transmitted by the network device;

if the pre-authorization information comprises a successful pre-authorization, performing, by the wireless routing device, wireless connection pre-authorization on the device identification information of the user device.

According to another aspect of the application, a computer readable medium comprising instructions is provided, and the instructions, when executed, cause a system to perform the operations of the above mentioned methods.

According to a further aspect of the present application, it is provided a user device for performing wireless connection pre-authorization for the user device. The user device comprises:

a processor; and a memory configured to store computer executable instructions, and the executable instructions, when executed, cause the processor to perform the above mentioned methods.

According to a further aspect of the present application, it is provided a network device for performing wireless connection pre-authorization on a user device. The network device comprises:

a processor; and a memory configured to store computer executable instructions, and the executable instructions, when executed, cause the processor to perform the above mentioned methods.

According to a further aspect of the present application, it is provided a wireless routing device for performing wireless connection pre-authorization on a user device. The wireless routing device comprises:

a processor; and a memory configured to store computer executable instructions, and the executable instructions, when executed, cause the processor to perform the above mentioned methods.

Compared with the prior art, in the present application, a user device transmits a wireless connection pre-authentication request to a network device; after receiving the wireless connection pre-authorization request, the network device determines pre-authorization information for device identification information of the user device with respect to a wireless routing device corresponding to the wireless connection pre-authorization request according to the device identification information of the user device, and transmits the device identification information of the user device and the pre-authorization information for the device identification information of the user device with respect to the wireless routing device to the wireless routing device; if the pre-authorization information comprises a successful pre-authorization, the wireless routing device performs wireless connection pre-authorization on the device identification information of the user device; since the user device has been pre-authorized, the user subsequently connects to a wireless access point corresponding to the wireless routing device by the user device without the need for an authorization process. Therefore, the user is released from tedious operations, the time for establishing connection is reduced, and user experience is optimized. Further, the wireless connection pre-authorization request may include target address information, identification information of a target wireless access point, target period information, etc. The user may select target address information, identification information of a target wireless access point, target period information and the like and initiate the wireless connection pre-authorization request to the network device, to bring more convenience to the user's operation.

It should be noted that the present application may be implemented in software and/or a combination of software and hardware, for example, by using an application specific integrated circuit (ASIC), a general purpose computer, or any other similar hardware device. In one embodiment, the software program of the present application may be executed by a processor to implement the steps or functions described above. Likewise, the software programs (including related data structures) of the present application may be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application may be embodied as a computer program product, such as computer program instructions, when executed by a computer, may invoke or provide a method in accordance with the present application. In some embodiments, computer program instructions exist in a computer-readable medium in a form of including, but not limited to, a source file, an executable file, an installation package file, and the like. Correspondingly, the manner in which a computer program instruction is executed by a computer includes, but is not limited to, the computer directly executing the instruction, or the computer compiling the instruction and then executing the corresponding compiled program, or the computer reading and executing the instruction, or the computer reading and installing the instruction and then executing the corresponding post-installation program. Here, the computer-readable medium may be any available computer-readable storage medium or communication medium that may be accessed by a computer.

Communication medium includes medium by which communication signals which include, for example, computer-readable instructions, data structures, program modules, or other data, are transmitted from one system to another. Communication medium may include guided transmission medium (such as cables and wires (e.g., fiber optics, coaxial, etc.)) and wireless (non-conductive transmission) medium that may propagate energy waves, such as sound, electromagnetic, RF, microwave, and infrared. Computer readable instructions, data structures, program modules or other data may be embodied, for example, as a modulated data signal in a wireless medium, such as a carrier wave or a similar mechanism such as being embodied as part of a spread spectrum technology. The term "modulated data signal" refers to a signal whose one or more characteristics are altered or set by encoding information in the signal. Modulation may be analog, digital, or may be hybrid modulation techniques.

By way of example and not limitation, computer-readable storage medium may include volatile and non-volatile, removable and non-removable medium implemented by any method or technology used to store information such as computer readable instructions, data structures, program modules or other data. For example, computer-readable storage medium includes, but is not limited to, volatile memory such as random access memory (RAM, DRAM, SRAM); and non-volatile memory such as flash memory, various read-only memories (ROM, PROM, EPROM, EEPROM), magnetic and ferromagnetic/ferroelectric memory (MRAM, FeRAM); and magnetic and optical storage devices (hard disk, cassette, CD, DVD); or other existing or known medium or any medium to be developed in the future that may store computer-readable information/data for use by computer systems.

In some embodiments, it is apparent that the present application is not limited to the details of the above-mentioned exemplary embodiments, and the present application may be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. The terms first and second and the like are used to represent names and do not represent any particular order.

What is claimed is:

1. A method for performing wireless connection pre-authorization on a user device at the user device, comprising:
    transmitting a wireless connection pre-authorization request of the user device to a network device, wherein the wireless connection pre-authorization request includes device identification information of the user device; and
    in determining located within a coverage range of a wireless access point to which the user device is permitted to connect based on the wireless connection pre-authorization request, transmitting a connection authentication request to a wireless access point corresponding to a wireless routing device;
    in determining the wireless access point receiving the connection authentication request is the wireless access point to which the user device is permitted to connect, receiving authentication response information returned by the wireless routing device providing the wireless access point; and
    connecting to the wireless access point.

2. The method according to claim 1, wherein the method further comprising:
    transmitting one or more wireless access points scanned by the user device to the network device; and
    receiving pre-authorization information for the device identification information of the user device with respect to the one or more wireless access points returned by the network device.

3. The method according to claim 2, wherein the step of connecting to the wireless access point, comprising:
    recognizing wireless access points to which the user device is permitted to connect according to the pre-authorization information; and
    automatically connecting to a preferred wireless access point from the wireless access points to which the user device is permitted to connect.

4. The method according to claim 1, wherein the method further comprising:
    transmitting an automatic connection request to the network device;
    receiving a preferred wireless access point returned by the network device, wherein geographic location information of the preferred wireless access point matches geographic location information of the user device and the preferred wireless access point is a wireless access point to which the user device is permitted to connect; and
    automatically connecting to the preferred wireless access point.

5. The method according to claim 1, wherein the wireless connection pre-authorization request includes at least one of:
    target address information corresponding to the wireless connection pre-authorization request;
    target period information corresponding to the wireless connection pre-authorization request; and
    device identification information and/or access point identification information of a target wireless access point corresponding to the wireless connection pre-authorization request.

6. The method according to claim 5, wherein when the wireless connection pre-authorization request comprises device identification information and/or access point identification information of a target wireless access point corresponding to the wireless connection pre-authorization request, the step of transmitting the wireless connection pre-authorization request of the user device to the network device comprising:
    detecting the device identification information and/or access point identification information of the target wireless access point; and
    transmitting the wireless connection pre-authorization request of the user device to the network device, wherein the wireless connection pre-authorization request includes the device identification information and/or access point identification information of the target wireless access point corresponding to the wireless connection pre-authorization request.

7. A method for performing wireless connection pre-authorization on a user device at a network device, comprising:
    acquiring a wireless connection pre-authorization request transmitted by the user device, wherein the wireless connection pre-authorization request includes target address information corresponding to the wireless connection pre-authorization request;
    querying and determining a wireless routing device corresponding to the wireless connection pre-authorization request according to the target address information;
    determining pre-authorization information for device identification information of the user device with respect to a wireless routing device corresponding to the wireless connection pre-authorization request according to the device identification information of the user device; and
    transmitting the device identification information of the user device and the pre-authorization information for the device identification information of the user device with respect to the wireless routing device to the wireless routing device.

8. The method according to claim 7, wherein the wireless connection pre-authorization request further includes target period information corresponding to the wireless connection pre-authorization request; the pre-authorization information for the device identification information of the user device with respect to the wireless routing device is valid within the target period information.

9. The method according to claim 7, wherein the method further comprising:
    receiving one or more wireless access points scanned by the user device which are transmitted by the user device;

determining pre-authorization information for device identification information of the user device with respect to the one or more wireless access points according to the device identification information of the user device; and returning the pre-authorization information for the device identification information of the user device with respect to the one or more wireless access points to the user device.

10. The method according to claim 7, wherein the method further comprising:

receiving an automatic connection request transmitted by the user device;

determining a preferred wireless access point based on the automatic connection request, wherein geographic location information of the preferred wireless access point matches geographic location information of the user device, and the device identification information of the user device has been pre-authorized wireless connection with respect to the preferred wireless access point; and returning the preferred wireless access point to the user device.

11. A method for performing wireless connection pre-authorization on a user device at a wireless routing device, comprising:

receiving device identification information of the user device and pre-authorization information for the device identification information of the user device with respect to the wireless routing device transmitted by a network device, wherein the pre-authorization information is valid within target period information;

in determining the pre-authorization information comprises a successful pre-authorization, performing wireless connection pre-authorization on the device identification information of the user devices; and in determining receiving a connection authentication request transmitted by the user device to a wireless access point corresponding to the wireless routing device, the connection authentication request is transmitted within the target period information, and the device identification information of the user device has been pre-authorized wireless connection with respect to the wireless access point, transmitting authentication pass response information to the user device.

12. The method according to claim 11, further comprising:

if the device identification information of the user device has not been pre-authorized wireless connection with respect to the wireless access point, performing authentication on the connection authentication request and transmitting corresponding authentication result information to the user device.

* * * * *